No. 710,820. Patented Oct. 7, 1902.
O. TIFFANY.
DIRT LOADING APPARATUS.
(Application filed Dec. 9, 1901.)
(No Model.) 2 Sheets—Sheet 2.
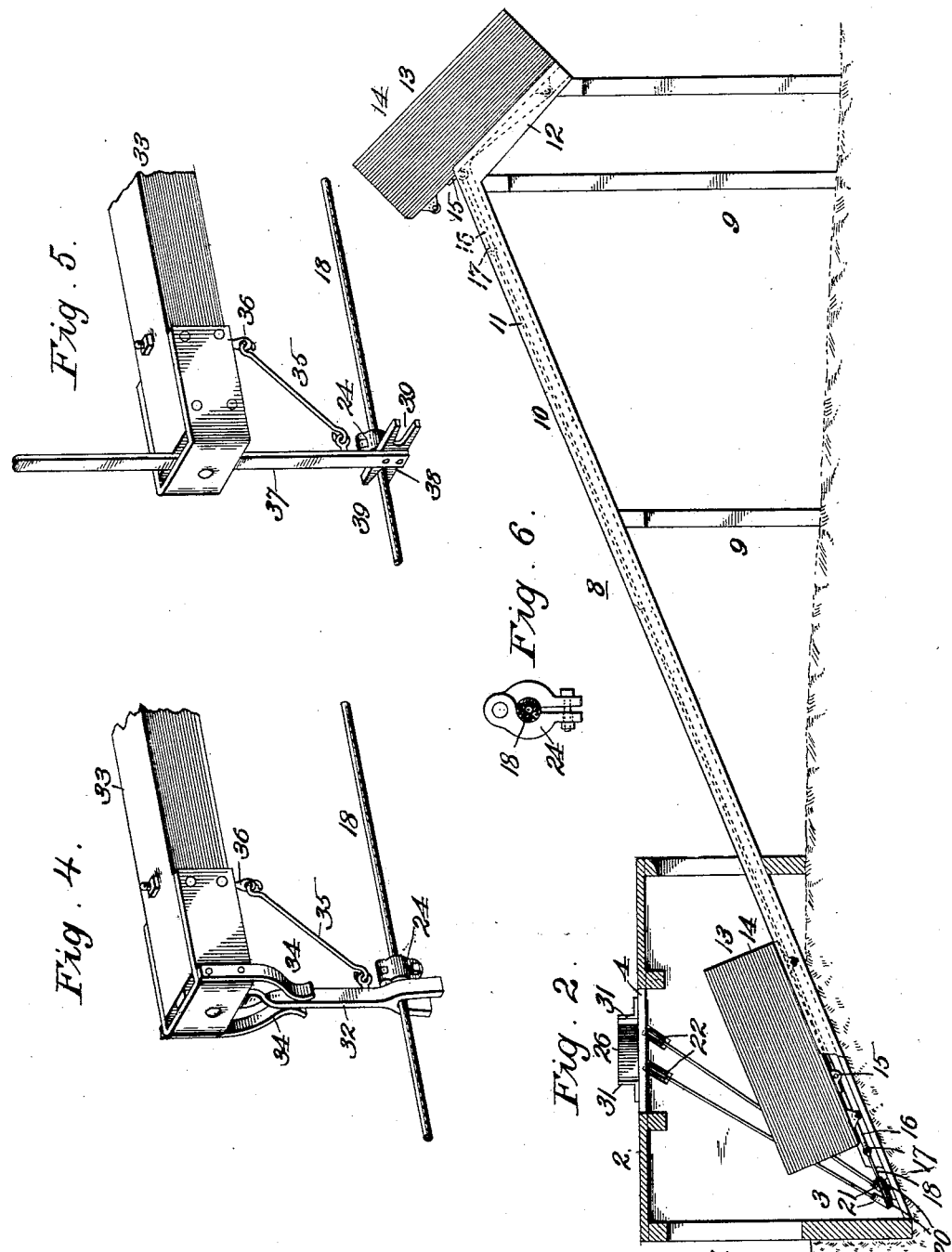
Witnesses:
Arthur McArthur
H. C. Rodgers
Inventor:
Oscar Tiffany
By Fischer & Shorpe
Attys

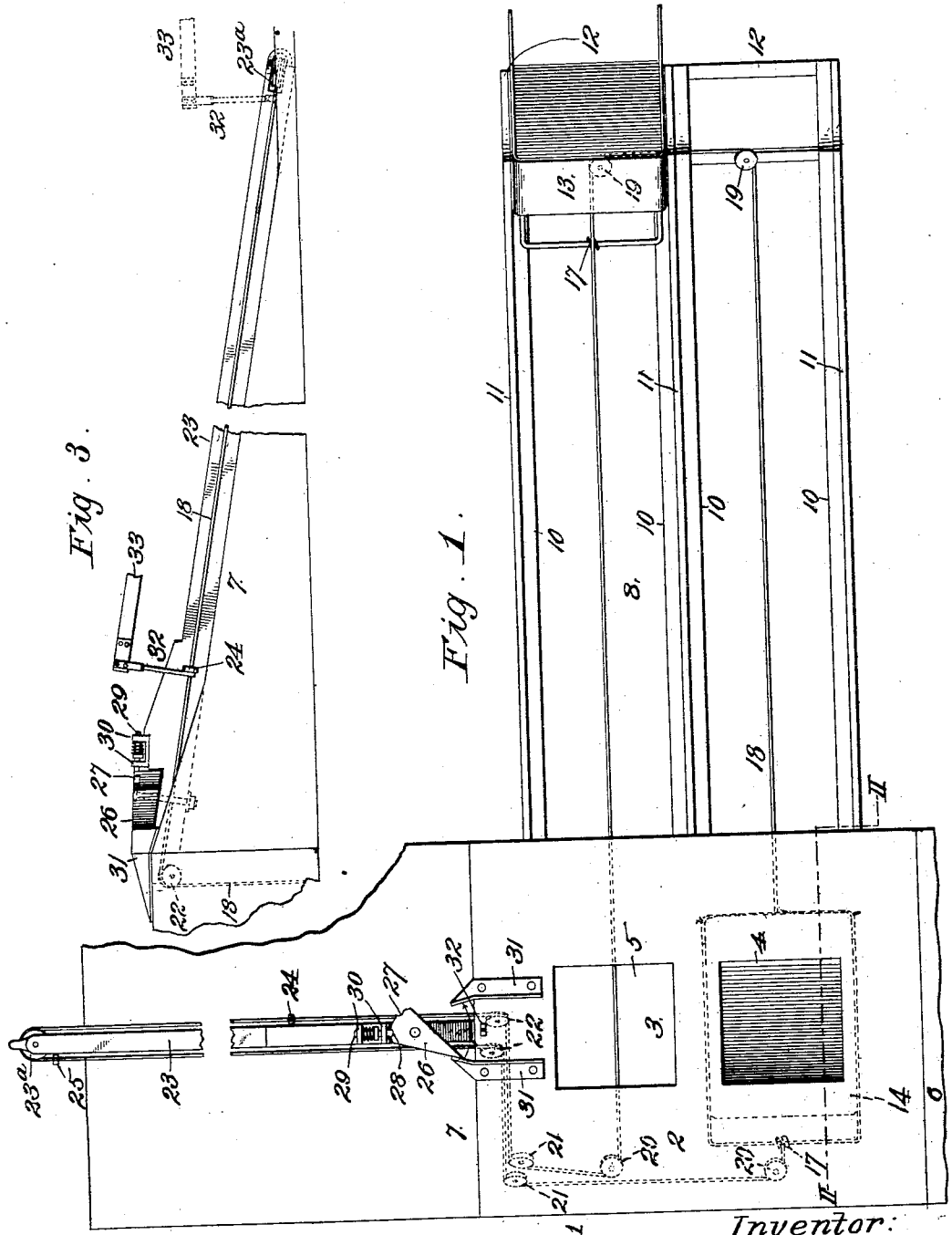

UNITED STATES PATENT OFFICE.

OSCAR TIFFANY, OF KANSAS CITY, MISSOURI.

DIRT-LOADING APPARATUS.

SPECIFICATION forming part of Letters Patent No. 710,820, dated October 7, 1902.

Application filed December 9, 1901. Serial No. 85,153. (No model.)

*To all whom it may concern:*

Be it known that I, OSCAR TIFFANY, a citizen of the United States, residing at Kansas City, in the county of Jackson and State of Missouri, have invented certain new and useful Improvements in Dirt-Loading Apparatus, of which the following is a specification.

My invention relates to dirt-loading apparatus; and my object is to produce an apparatus of this character wherein the draft-animals used in shoveling or gathering the dirt from the ground shall also be utilized for the purpose of elevating the dirt to the required point, and thus save the expense of an additional team and driver necessary with all other dirt-loaders embodying an elevator with which I am familiar.

A further object is to provide an apparatus with at least a pair of dumping-cars to be charged and emptied alternately and means whereby the wheeled scrapers or other devices used in charging said cars shall automatically effect the ascent of the car just charged and the descent of the other or empty car.

A still further object is to produce an apparatus of this character which is positive and reliable in operation.

With these objects in view the invention consists in certain novel and peculiar features of construction and combinations of parts, as hereinafter described and claimed, and in order that it may be fully understood reference is to be had to the accompanying drawings, in which—

Figure 1 is a top plan view of a dirt-loading apparatus embodying my invention. Fig. 2 is a section of the same taken on line II II of Fig. 1, the car below being shown in elevation. Fig. 3 is a side view of the inclined plane which the animals pass down and of the mechanism whereby they raise the loaded and lower the unloaded car. Fig. 4 is an enlarged perspective view of part of the tongue of the wheeled scraper or other dirt-loading machine and showing said tongue above and detachably connected to the cable used in operating the cars. Fig. 5 is a similar view of a modified construction. Fig. 6 is an enlarged view showing on the cable the adjustable collar whereby the movement of the wheeled scraper or its equivalent imparts movement to the cable, and therefore to the cars.

Referring now to the drawings in detail, 1 designates a suitable framework, preferably of skeleton type, as shown, and surmounted by a platform 2 a short distance above the ground and surrounding, by preference, a cavity 3 in the ground, the provision of said cavity rendering feasible a low platform, so as to lighten the labor of the draft-animals which have to pull a loaded scraper or equivalent machine up to and upon said platform for the purpose of dumping its charge through either opening 4 or 5 thereof. A portion of a wheeled scraper is shown in the drawings, which scraper may be of the same type as that shown in Patent No. 643,693, issued February 20, 1900, to Sell S. Spindle.

The inclined planes 6 and 7 are arranged in alinement with said openings, the former being the plane of ascent and the latter the plane of descent. Arranged at right angles to said planes is an elevating-track 8, consisting of a series of uprights 9 and track-rails 10, the latter being provided with side rails 11. This elevating-track is double, with its lower end underlying openings 4 and 5 and its upper end elevated sufficiently high to dump into a wagon, its extreme end being pitched downwardly, as at 12, so as to permit the cars to dump automatically in a manner hereinafter explained without any danger of dislodgment from the track, and in this connection it should be understood that this elevating-track may be of sufficient length and height to discharge into wagons on the street-level. In this case, however, it would probably be necessary to hitch a couple of extra horses to assist the wheeled-scraper team.

13 14 designate two similar wheeled cars mounted on the tracks and retained thereon by the side rails, said cars being open at their front end and of about capacity equal to a wheeled scraper and adapted to pass back and forth through the opening in the skeleton frame through which the tracks extend. They are provided at their outer margins and rearward of their center with bearings 15, in which are journaled rearwardly-projecting bails 16, to which are attached, as at 17, an endless cable 18. This cable extends centrally of each track from its lower end to its apex and from the apex of one track to the apex of the other around guide-pulleys 19. At the lower end of the track the cable extends around pulleys 20 to pulleys 21 and from the latter to pulleys 22 in about the plane of the highest points of the inclines 6 and 7. From pulleys 22 the cable extends at opposite sides of a bar 23, which is pitched, preferably, to correspond with incline 7, and around a pulley 23ª, secured to the end of said bar at a point a slight distance forward of the lower end of the plane 7, (see Fig. 3,) for a purpose which hereinafter appears, and clamped rigidly upon the strands of the cable at opposite sides of bar 23 are similar collars 24 25, the former being contiguous to the platform when collar 25 is contiguous to the pulley, and vice versa.

Pivoted to the upper side of bar 23 adjacent to the platform is a V-shaped switch 26, with its point projecting toward the platform and provided with notches 27 28 in its outer edge, adapted for engagement by a spring-actuated dog 29, mounted in a guide, and supporting-bracket 30, secured to the bar. The point of the switch is adapted to play between and be stopped by a pair of guides 31, secured to the platform, these guides being for the further purpose of insuring the passage between them of the descending fork 32, pivoted to operate laterally at its upper end to the rear end of the tongue 33 of a wheeled scraper or other machine, said fork being engaged at opposite sides below its pivot by springs 34 and at its front side by an inclined brace 35, the front and upper end of said brace being secured by an eyebolt 36 to said tongue 33.

In Fig. 5 in lieu of the spring-actuated fork 32 I employ a lever 37, having at its lower end a cross-bar 38, which is forked at each end, as at 39.

In the practical operation of the machine, assuming that car 14 is at the lower end and car 13 at the upper end of the track, the wheeled scraper passes up incline 6 and dumps through opening 4 into car 14. It then continues onward, and guides 31 insure the passage between them of the depending fork, and owing to the fact that the switch covers a space as wide as that between said guides the fork necessarily strikes it and is deflected to the right. As it passes the axis of the switch its pressure is sufficiently great to overcome that of the spring-actuated dog 29 and throw the switch in the direction indicated by the arrow, Fig. 1, until its front end strikes and is stopped by the right-hand guide 31, dog 29 instantly engaging notch 27 to prevent any rebound of the switch, and thus hold it reliably in its new position. As the fork performs this operation it is pressed back by the right-hand spring 34 (or by the hand of the driver where the construction shown in Fig. 5 is employed) against the corresponding side of bar 23, so that it shall engage the cable. Immediately after this engagement is effected it strikes collar 24, and thus operates the cable. This operation of the cable simultaneously moves the loaded car 14 up the track, lowers the empty car 13, and moves collar 25 to a point contiguous to the switch. In the action just mentioned the loaded car is projected beyond the apex of the track until its greatest weight is forward thereof, when immediately it tilts downward, as shown by car 13, Fig. 2, and discharges its contents into the wagon adapted to receive it, the bail under the tension of the cable remaining in the plane of the latter, so that it shall have the necessary leverage as the car begins to ascend to tilt the empty car to its original position preliminary to its descent. As the next wheeled scraper passes up incline 6 and over the platform it dumps through opening 5 into car 13 below and then passing between guides 31 strikes the switch and is deflected to the left, and as it passes the axis of the switch the latter is operated to the position shown in full lines, Fig. 1. The fork then engages the cable at the left-hand side of bar 23 and in its descent engages collar 25 of the cable and effects the ascent of car 13 and the descent of car 14. To effect the disengagement of the fork 32 from the cable and collar as soon as the dumping action is completed, the pulley 23ª is arranged in the plane of the lower end of incline 7 and forward thereof, as hereinbefore stated. This arrangement establishes a converging relation between the cable and the surface in advance of said plane, so that as the fork strikes and advances along said surface it is, in effect, gradually raised upward until totally disengaged from the cable and collar. With the construction shown in Fig. 5 this disengagement can be effected by simply swinging lever 37 in the proper direction.

All future operations are repetitions of those described and further description is believed to be unnecessary, and while I have illustrated and described my preferred construction it is to be understood that it can be modified in various particulars without departing from the principle and scope of the appended claims.

Having thus described the invention, what I claim as new, and desire to secure by Letters Patent, is—

1. In a dirt-loading apparatus, a platform provided with an opening, an elevating-track having its lower end below said opening, an endless cable suitably guided and extending up said track, a car upon the track and attached to the cable, and a machine adapted for passing over the platform to engage said cable and draw the car up the track, substantially as described.

2. In a dirt-loading apparatus, a platform provided with a pair of openings, an elevating-track having its lower end below said openings, an endless cable suitably guided and extending up said track, a pair of cars secured to said cable and located at opposite ends of the track, the lower one loaded, and a machine for engaging said cable and simultaneously elevating one of said cars and lowering the other, substantially as described.

3. In a dirt-loading apparatus, a platform provided with a pair of openings, an elevating-track having its lower end below said openings, and pitched downwardly as at 12 at its upper end, cars upon the track, an endless cable connecting the cars extending longitudinally of the track, and bails secured to the cable and pivotally connected to the cars rearward of their center, substantially as described.

4. In a dirt-loading apparatus, a platform provided with a pair of openings, an elevating-track having its lower end below said openings, an endless cable suitably guided and extending longitudinally of said track, cars upon said track and attached to said cable, a pulley around which the cable extends located from the platform a distance equal to the length of the elevating-track, machines for engagement with one of the strands or the other of said cable where it leads from said pulley, and a switch for automatically causing said machines to engage one of said strands, so as to raise the loaded and lower the unloaded car upon the track, and be operated by said machines so as to deflect the next one into engagement with the other strand and thereby reverse the operation of said cars, substantially as described.

5. In a dirt-loading apparatus, a platform provided with a pair of openings, an elevating-track having its lower end below said openings, an endless cable suitably guided and extending longitudinally of said track, cars upon said track and attached to said cable, a pulley around which the cable extends located from the platform a distance equal to the length of the elevating-track, a switch, a moving pivoted fork to be deflected by and operate said switch and then detachably engage said cable so as to operate the same and thereby the cars, substantially as described.

6. In a dirt-loading apparatus, a platform provided with a pair of openings, an elevating-track having its lower end below said openings, an endless cable suitably guided and extending longitudinally of said track, cars upon said track, and attached to said cable, a pulley around which the cable extends located from the platform a distance equal to the length of the elevating-track, a pair of guide-bars on the platform, a switch limited as to movement by and between said guide-bars, a dog to yieldingly lock it in position against one guide-bar or the other, and a moving device to pass between said guide-bars and be deflected by said switch into engagement with one strand of the cable, and to instantly reverse the position of the switch, substantially as described.

7. In a dirt-loading apparatus, a platform provided with a pair of openings, an elevating-track having its lower end below said openings, an endless cable suitably guided and extending longitudinally of said track, cars upon said track, and attached to said cable, a pulley around which the cable extends located from the platform a distance equal to the length of the elevating-track, a pair of guide-bars on the platform, a switch limited as to movement by and between said guide-bars, a dog to yieldingly lock it in position against one guide-bar or the other, and a moving device to pass between said guide-bars and be deflected by said switch into engagement with one strand of the cable and to instantly reverse the position of the switch, and adapted to reverse the cable at the moment the cars have traversed the full length of the track, substantially as described.

In testimony whereof I affix my signature in the presence of two witnesses.

OSCAR TIFFANY.

Witnesses:
ARTHUR McARTHUR,
G. Y. THORPE.